3,415,890
NOVEL HALOGENATED CYCLOALKYLETHER COMPOSITIONS
Louis G. Anello, Basking Ridge, and Richard F. Sweeney, Dover, N.J., assignors to Allied Chemical Corporation, New York, N.Y., a corporation of New York
No Drawing. Filed Nov. 2, 1964, Ser. No. 408,391
20 Claims. (Cl. 260—611)

ABSTRACT OF THE DISCLOSURE

Halogenated cycloalkyl ethers having the formula

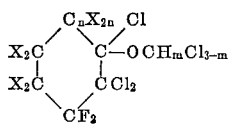

wherein X may be F or Cl, $n$ may be 0 or 1 and $m$ may be 1–3 are prepared by chlorinating, at low temperatures, corresponding methoxy-perhalogenated cycloalkenes having the formula

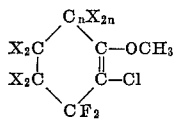

wherein X and $n$ are the same as above, in the presence of actinic radiation. These compounds have utility as solvents for polymers, terpolymers and copolymers of trifluorochloroethylene and as sealing adjuvants for films of such polymers.

---

This invention relates to the production of a novel class of halogenated cycloalkylethers.

An object of this invention is to provide a novel class of chemical compounds and more particularly to provide a class of halogenated cyclopentylethers and cyclohexylethers, the halogen atoms being fluorine and chlorine, there being a minimum of two ring substituted fluorine and three ring substituted chlorine atoms in the molecule.

Another object of the invention is to provide a novel process for the production of halogenated cycloalkylethers, the halogen atoms being fluorine and chlorine, there being a minimum of two ring substituted fluorine and three ring substituted chlorine atoms in the molecule.

Other objects and advantages will be apparent from the following description and discussion of the subject invention.

In accordance with the invention, a novel class of chemical compounds is produced by chlorinating, at low temperatures, a methoxy-perhalogenated cycloalkene having the formula:

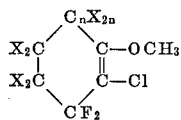

wherein X may be F or Cl and $n$ may be 0 or 1, in the presence of actinic radiation. By this process a novel class of halogenated cycloalkylethers is produced, having the formula:

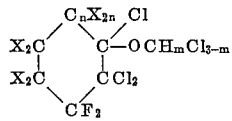

wherein X and $n$ are the same as above and $m$ may be 1–3.

It is postulated that the reaction sequence for an illustrative embodiment, vis, the chlorination of 1-chloro-2-methoxyoctafluorocyclohexene to the corresponding chlorinated cyclohexylether proceeds as follows, although it is not intended that this invention be limited by any particular theory of operation:

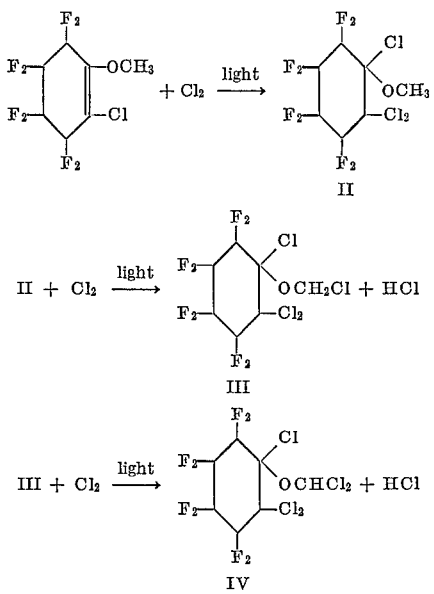

It can be seen that chlorine adds on to the unsaturated bond of the cyclohexene starting material and additionally substitutes, to a greater or lesser extent, for the hydrogen atoms contained in the hydrocarbon moiety of the methoxy group.

This result is obtained at temperatures below about 25° C. and is surprising since, at temperatures between about 25° C. and 130° C., the major products derived from the chlorination of such materials are the corresponding dichloroperhalogenated cycloalkylketones, the preparation of which is claimed in copending, commonly assigned application of Louis G. Anello and Richard F. Sweeney, Ser. No. 381,229, filed July 8, 1964 and now abandoned. Although the starting materials and basic reaction procedures are the same in both processes; it has been discovered that by use of reaction temperatures of below about 25° C., the character of the reaction is shifted to the ether product, nearly exclusively of the ketone product, as contrasted with a shift of the character of the reaction to the latter product, at temperatures above about 25° C.

Where the corresponding chlorinated cyclopentylethers are desired, the corresponding 1-chloro-2-methoxyperhalogenated cyclopentene is employed and the reaction proceeds substantially in the same way.

The reaction of the invention can be carried out in an ordinary Pyrex vessel, although a higher photon efficiency can be obtained if a vessel made of quartz or "Vycor" glass is used. The reaction vessel can be optionally equipped with a gas inlet dip tube, a condenser, a stirrer, a thermometer and heating or cooling means.

The methoxyperhalogenated cycloalkene starting materials are normally liquids at room temperature and may be prepared by reacting the corresponding dichloroperhalogenated cycloalkene, wherein two chlorine atoms are vicinally attached to the unsaturated carbon atoms, with an alkali metal alkoxide. The reaction, which is more fully described in copending application of Richard F. Sweeney, Ser. No. 348,277, filed Feb. 28, 1964 and now Patent No. 3,354,223, is carried out in a reaction medium comprising a polar solvent, preferably an alkanol corresponding to the alkali metal alkoxide starting material, at temperatures from about 0° to about 90° C.

The preferred mode of carrying out the reaction of the present invention is as follows: One of the starting materials referred to hereinafter as ether, is introduced into the described reaction vessel. The chlorine gas is then passed through the ether initiating the reaction which is exothermic. The reaction temperature may be controlled by regulation of chlorine flow rates to control exotherm, by removal of heat of reaction, by any conventional heating or cooling means, or by any combination of the above.

Depending upon the ratio of chlorine to ether employed, the reaction can be controlled selectively to yield predominantly product in which the methoxy group is unchlorinated, monochlorinated or dichlorinated. All that is required is use of the stoichiometric quantity of chlorine required for the desired end product, or of a slight excess thereover.

As mentioned heretofore, good yields are obtained when the reaction is run at temperatures between about 0° and 25° C. The basic reaction, at temperatures above this range, shifts in favor of those products disclosed in the copending application, discussed supra. Reduced yields of halogenated cycloalkylether products may be obtained at temperatures up to about 50° C.; these products being formed concurrently with the ketone products of the copending application, Optimum yields of the halogenated cycloalkylether products are obtained when temperatures are maintained substantially in the range of about 0°–10° C. At temperatures below 0° C., the starting material, thus having increased viscosity, consumes chlorine at a much reduced rate.

Simultaneously with the passing of the chlorine gas through the ether, the reaction mixture must be exposed to actinic radiation. Actinic radiation may be defined as the action of any light which effects chemical change. Thus, any form of light which effects chemical reaction may be employed, such as ordinary sunlight, ultraviolet light, commercial incandescent light and fluorescent light. The preferred form of light is ultraviolet which can conveniently be provided by any commercial mercury arc lamp or sun lamp. It has been found that a commercial high pressure mercury arc lamp enclosed in a Vycor water jacket, which lamp is maintained at a distance of 1 to 3 inches from the reaction vessel, affords a particularly good temperature control although the intensity of the light used is not critical in the subject invention. As a general rule, the speed of the reaction will be directly proportional to the intensity of light employed.

Due to the relatively low temperatures at which the subject reaction must be run, it is important that means be provided for removing the heat generated by the light producing lamps. This can be done by any suitable means and is conveniently accomplished by placing the lamp in a water cooled Vycor or quartz immersion well, which is set directly into the reaction vessel. The reaction vessel, in turn, is placed into an ice water cooling bath. Such means also assist in removing reaction exotherm which tends to bring up the temperature in the reactor.

As mentioned hereinbefore, it is desirable to positively and effectively remove the reaction exotherm. The effective rate of chlorination, or chlorine addition, is determined by the efficiency with which the exothermic heat of reaction is dissipated by the cooling means. Higher rates of chlorine consumption require, as will be understood, higher rates of heat removal from the reaction mixture to maintain selected reaction temperatures. The only limitation on chlorine addition rate is the heat removal capacity of the heat exchange equipment used within the reactor volume and the only penalty upon use of relatively low cooling capacity is the length of time required to effect consumption of the predetermined quantity of chlorine considering the extent of chlorination desired in the end product.

The progress and time of reaction can be determined by measuring the amount of HCl evolved. This can be accomplished by weighing the water scrubber or by measuring the amount of HCl absorbed in the water scrubber, such as by the Volhard chloride determination. The various halogenated cycloalkylether products will be recovered as a mixture comprising the 1,1,2-perhalogenated-2-methoxy-, 2-monochloromethoxy- and -2-dichloromethoxy derivatives of the corresponding halogenated cycloalkenylether starting material employed. The composition of the product mixture will depend on the quantity of chlorine consumed. The extent of chlorination and the nature of the reaction product can be determined by comparing the ratio of the evolved moles of HCl to the total moles of the halogenated ether charged. Experience has shown that, in the case of the halogenated cyclohexylether products; when the reaction is allowed to continue until the ratio of the evolved moles of HCl to the total moles of halogenated ether starting material charged is about 0.3:1, the major product obtained is the corresponding 1,1,2-trichloro-2-methoxy derivative. When the reaction is further continued until the ratio of evolved moles of HCl to the total moles of halogenated ether charged is about 0.8:1, the major product obtained is the corresponding monochloromethoxy derivative and the minor product is the corresponding unsubstituted (-2-methoxy) derivative. If the reaction is further run until the ratio of evolved moles of HCl to moles of halogenated ether charged is about 1.3:1, the product will consist of approximately equal mole ratios of the monochloromethoxy and dichloromethoxy derivatives. Experience indicates, in the case of the corresponding halogenated cyclopentylether products; when the reaction is run until the ratio of moles of evolved HCl to the moles of halogenated ether charged is about 0.7:1, the major product obtained will be the corresponding monochloromethoxy halogenated cyclopentane. If the reaction is continued until the ratio of moles of evolved HCl to the moles of ether charged is about 2.1:1, the major product obtained will be the corresponding dichloromethoxy compound. Thus, the composition of the product mixture may be varied and controlled by the various factors outlined supra.

Although the process can be carried out under either atmospheric, subatmospheric or superatmospheric pressure; atmospheric pressure is preferable and most practical. The atmosphere is desirably devoid of air or oxygen, which can be swept out by the chlorine gas or can be initially removed from the reaction vessel by purging with an inert gas, such as nitrogen.

The products, which are liquids, are typically removed from the reaction mixture after completion of the reaction by distillation.

As illustrative of the scope and intendment of the invention, the following represents a partial listing of the novel compounds falling within the scope of the invention; it being understood that this listing is for illustrative purposes only, said listing not being all inclusive and the inventors not limited thereby, but only by the scope of the invention as defined in the claims:

1,1,2-trichloro-2-methoxyoctafluorocyclohexane
1,1,2-trichloro-2-monochloromethoxyoctafluorocyclohexane
1,1,2-trichloro-2-dichloromethoxyoctafluorocyclohexane
1,1,2-trichloro-2-methoxyhexafluorocyclopentane
1,1,2-trichloro-2-monochloromethoxyhexafluorocyclopentane
1,1,2-trichloro-2-dichloromethoxyhexafluorocyclopentane
1,1,2,3,3,4,4,5,5-nonachloro-2-methoxydifluorocyclohexane
1,1,2,3,3,5-hexachloro-2-dichloromethoxypentafluorocyclohexane 1,1,2,4,4,6,6-heptachloro-2-monochloromethoxytetrafluorocyclohexane 1,1,2,3,3-pentachloro-2-dichloromethoxyhexafluorocyclohexane 1,1,2,3,3,4,4,5,5-nonachloro-2-dichloromethoxydifluorocyclohexane 1,1,2,3,4,5,5-heptachloro-2-methoxydifluorocyclopentane 1,1,2,3,3,4,4-heptachloro-2-monochloromethoxydifluorocyclopentane 1,1,2,3,3-pentachloro-2-dichloromethoxytetrafluorocyclopentane 1,1,2,5,5-pentachloro-2-dichloromethoxytetrafluorocyclopentane The following examples will serve to further illustrate the objects and practice of the present invention. Parts and percentages are by weight, unless otherwise stated.

EXAMPLE 1

The apparatus consisted of a 3¼″ I.D. by 10″ round bottom tubular Pyrex reactor, which was fitted with a Vycor water-cooled immersion well containing a commercial mercury arc light. The reactor is further equipped with an inlet tube at the bottom for chlorine gas and an outlet at the top of the reactor for exit gas. The apparatus was constructed and arranged so that gases exiting from the outlet are passed first through a water-cooled condenser and then through a water scrubber and caustic scrubber. The caustic scrubber contained a 10% solution of aqueous sodium hydroxide. The tubular reactor, which was maintained in an ice-water bath so as to control temperatures therein to between about 0° and 5° C., was charged with 362 g. (1.25 moles) of 1-chloro-2-methoxyoctafluorocyclohexene. 113 g. (1.6 moles) of chlorine was passed into the reactor via the inlet tube over a period of 6 hours, during which time the reactor contents were irradiated with the mercury arc light. The arc light was positioned about one inch from the reactor. At the end of the reaction period, a total of 7.0 g. (0.10 mole) of unreacted chlorine and 16 g. (0.44 mole) of HCl was recovered from the exit gas stream. A 100 g. sample of liquid product mixture was removed from the reactor. A small portion of this product mixture was analyzed by gas-liquid chromatography and the remainder was distilled. The chromatographic analysis showed that this product contained 11.6 volume percent starting material, 62 volume percent 1,1,2-trichloro-2-methoxyoctafluorocyclohexane and 18.5 volume percent of 1,1,2-trichloro-2-monochloromethoxyoctafluorocyclohexane. 55 g. (0.15 mole) of 1,1,2-trichloro-2-methoxyoctafluorocyclohexane (B.P. 187° C., M.P. 101–103° C.) was recovered from the portion of the product mixture distilled.

*Analysis.*—Calculated for $C_7H_3Cl_3F_8O$: F, 42.0 percent; Cl, 29.5 percent; H, 0.83 percent. Found: F, 41.5 percent; Cl, 29.7 percent; H, 0.80 percent.

EXAMPLE 2

The chlorination procedure described in Example 1 was continued on the remainder of the reaction product in the reactor. 66 g. (0.93 mole) of additional chlorine was passed into the reactor over a period of 3½ hours, during which time the reactor was maintained at 0° C. to 5° C. and its contents irradiated with the mercury arc light. At the end of this period a total of 15 g. (0.21 mole) of unreacted chlorine and 17 g. (0.465 mole) of HCl was recovered from the exit gas stream. A 100 g. sample of the liquid product mixture was removed from the reactor. A portion of this material was analyzed by gas-liquid chromatography and the remainder of the sample was distilled. Chromatographic analysis showed that the mixture contained 5.3 volume percent starting material, 18.4 volume percent of 1,1,2-trichloro-2-methoxyoctafluorocyclohexane, 68 volume percent of 1,1,2-trichloro-2-monochloromethoxyoctafluorocyclohexane and 8% higher boiler. 62 g. (0.15 mole) of 1,1,2-trichloro-2-monochloromethoxyoctafluorocyclohexane (B.P. 83–84° C./10 mm.) was recovered from the portion of the product mixture distilled.

*Analysis.*—Calculated for $C_7H_2Cl_4F_8O$: F, 38.4 percent; Cl, 35.9 percent; H, 0.50 percent. Found: F, 37.9 percent; Cl, 35.6 percent; H, 0.45 percent.

EXAMPLE 3

The chlorination procedure described in Example 2 was continued. 36 g. (0.50 mole) of additional chlorine was passed into the product mixture, remaining from Example 2, over an additional two hour period, under the influence of the mercury arc light as before. At the end of this period, a total of 10 g. (0.14 mole) of unreacted chlorine and 13 g. (0.35 mole) of HCl was recovered from the exit gas stream. A total of 278 g. of organic material was recovered from the reactor. A sample of this material was analyzed by gas-liquid chromatography and 139 g. of the material was purified by distillation. Gas chromatographic analysis showed that the product mixture contained 50.5 volume percent of 1,1,2-trichloro-2-monochloromethoxyoctafluorocyclohexane and 48 volume percent of 1,1,2-trichloro-2-dichloromethoxyoctafluorocyclohexane. 72 g. (0.18 mole) of 1,1,2-monochloromethoxyoctafluorocyclohexane and 64 g. (0.15 mole) of 1,1,2-trichloro-2-dichloromethoxyoctafluorocyclohexane (B.P. 94° C./10 mm.) were recovered from the portion of the product mixture distilled.

*Analysis.*—Calculated for $C_7HCl_5F_8O$: F, 35.0 percent; Cl, 40.7 percent; H, 0.23 percent. Found: F, 35.2 percent; Cl, 40.7 percent; H, 0.22 percent.

EXAMPLE 4

The apparatus was the same as used in Example 1, excepting that the apparatus was equipped with a gas inlet dip tube for introducing chlorine gas and the apparatus was constructed and arranged so that gases exiting from outlet through the condenser, which was a water-cooled reflux condenser, passed through the water and caustic scrubbing train after passing through a wet ice-cooled trap. The reactor contents were maintained between about 0° and 10° C. by means of an ice water bath. The reactor was charged with 129 g. (0.536 mole) of 1-chloro-2-methoxyhexafluorocyclopentene-1. Chlorine was passed into the flask via the dip tube over a period of five hours, during which time the contents were irradiated with the mercury arc light, which was positioned about one inch from the reaction vessel. A total of 0.34 mole of evolved HCl was absorbed in the water scrubber. 164 g. of organic material were recovered from the reaction vessel. A sample of this product mixture was separated by gas chromatography, which proved to be 57 volume percent of 1,1,2-trifluoro-2-monochloromethoxyhexafluorocyclopentane, 30 volume percent of 1,1,2-trichloro-2-methoxyhexafluorocyclopentane and 5 volume percent of 1,1,2-trichloro-2-dichloromethoxyhexafluorocyclopentane. The gas chromatography instrument used was an Aerograph Model A-700, using a QF1 column of silicon oil on fire brick. A sufficient amount of the product mixture obtained was distilled in order to give material for elemental assay. The fraction recovered at 76–78° C./8 mm. was identified as 1,1,2-trichloro-2-monochloromethoxyhexafluorocyclopentane by infrared spectrum and elemental analysis. The major absorption peaks found in the infrared spectrum, in microns, were as follows: 6.91, 7.62, 7.81, 8.40, 8.95, 9.35, 9.50, 9.80, 10.1, 11.3, 12.1.

*Analysis.*—Calculated for $C_6H_2OCl_4F_6$: Cl, 41.0 percent; H, 0.58 percent. Found: Cl, 40.6 percent; H, 0.50 percent.

The fraction recovered at 172–178° C., at atmospheric pressure, was a readily sublimable solid possessing a M.P. of 90–100° C. It was determined by infrared spectrum analysis and elemental analysis to be 1,1,2-trichloro-2-methoxyhexafluorocyclopentane. The major absorption peaks found in the infrared spectrum, in microns, were as follows: 6.92, 7.62, 7.85, 8.40, 8.95, 9.45, 9.62, 10.0, 10.11.

*Analysis.*—Calculated for $C_6H_3OCl_3F_6$: Cl, 34.4 percent; H, 0.96 percent. Found: Cl, 34.7 percent, H, 0.80 percent.

EXAMPLE 5

The apparatus used in this experiment was the same as that described and used in Example 4. The reaction vessel was charged with 120 g. (0.499 mole) of 1-chloro-2-methoxyhexafluorocyclopentene-1. Chlorine was passed into the vessel via the gas inlet dip tube, over a period of twenty hours, during which time the reactor contents were irradiated with the mercury arc lamp, positioned about one inch from the reaction vessel. As before, the reaction temperature in the vessel was not permitted to exceed about 10° C. A total of 1.07 mole of evolved HCl was absorbed in the water scrubber. The amount of organic material recovered from the reaction flask was 172 g. A sample of the product mixture, thus obtained, was separated by gas chromatography into two major components, which were shown to be 1,1,2-trichloro-2-dichloromethoxyhexafluorocyclopentane (80 volume percent) and 1,2-dichlorohexafluorocyclopentene-1 (11 volume percent), by infrared spectrum and elemental analysis. The former compound boils between 84–93° C./8 mm. The major absorption peaks found in the infrared spectrum, in microns, were as follows: 7.60, 7.81, 8.32, 8.69, 8.95, 9.40, 9.75, 10.10, 11.20, 11.75, 12.10, 12.85, 13.32.

*Analysis*:—Calculated for $C_6HOCl_5F_6$: Cl, 46.6 percent; H, 0.26 percent. Found: Cl, 46.4 percent, H, 0.26 percent.

EXAMPLE 6

1,1,2 - trichloro - 2 - monochloromethoxycyclooctafluorocyclohexane, 1,1,2-trichloro-2-dichloromethoxyoctafluorohexane, 1,1,2-trichloro-2-monochloromethoxyhexafluorocyclopentane and 1,1,2-trichloro-2-dichloromethoxyhexafluorocyclopentane were tested as sealing adjuvants for strips of thermoplastic film composed of a copolymer of about 96% trifluorochloroethylene and about 4% vinylidine fluoride. Saturated solutions of this polymer in the ether products were prepared by separately refluxing each of the above-described ether materials with said polymer, cooling the mixtures to room temperature and decanting the solutions from the undissolved polymer. Each of two pairs of the polymer film were sealed together without use of sealing adjuvant. Each of four more pairs of polymer film strips were sealed together, this time employing as sealing adjuvant, the four above-described polymer solutions in the various ether products, one of said solutions for each of the four pairs of polymer film strips. The sealing adjuvant solutions were applied by merely coating, as by brushing, the inner surfaces of the film strips to be sealed. In all cases, an impulse heat sealer was used. The impulse heat sealer was a Sentinel Impulse Sealer manufactured by Packaging Industries, Inc., of Montclair, N.J. The sealing pressure was 30 p.s.i. The heat sealing temperature was either 375° or 400° F. The dwell time for the seal, or in other words, the length of time during which the pressure and heat were applied to effect the seal, was three (3) seconds. It was attempted to test the seal strength by measuring the amount of force needed to rupture or pull apart the seal. The sealing adjuvants, however, apparently had varying effects on the strength of the polymer film in the vicinity of the seal, for the polymer film ruptured before the seals, at a point away from the sealing area. As can be seen from the following table, the polymer film pairs sealed with the adjuvant solutions at the indicated temperatures, ruptured at weights considerably higher than those film pairs which were not so treated.

TABLE I

|  | Temp., ° F. | Wgt. to effect rupture (g.) |
|---|---|---|
| Films heat-sealed without the use of adjuvant | 375–400 | 323–345 |
| Films heat-sealed with a polymer solution in 1,1,2-trichloro-2-monochloromethoxyoctafluorocyclohexane | 375 | >890 |
| In 1,1,2-trichloro-2-dichloromethoxyoctafluorocyclohexane | 375 | >2,660 |
| In 1,1,2-trichloro-2-monochloromethoxyhexafluorocyclopentane | 375 | >1,810 |
| In 1,1,2-trichloro-2-dichloromethoxyhexafluorocyclopentane | 400 | >1,604 |

Mixtures of the subject compounds may also be employed as sealing adjuvants, with advantageous results. Although a copolymer of about 96% trifluorochloroethylene and about 4% vinylidine fluoride was employed, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

We claim:
1. Halogenated cycloalkylethers of the formula:

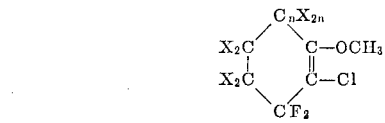

wherein X is F or Cl, $n$ is 0–1 and $m$ is 1–3.
2. Halogenated cycloalkylethers as defined in claim 1 wherein $n$ is 0.
3. Halogenated cycloalkylethers as defined in claim 1 wherein $n$ is 1.
4. 1,1,2-trichloro-2-methoxyoctafluorocyclohexane.
5. 1,1,2-trichloro - 2 - monochloromethoxyoctafluorocyclohexane.
6. 1,1,2 - trichloro - 2 - dichloromethoxyoctafluorocyclohexane.
7. 1,1,2 - trichloro - 2 - methoxyhexafluorocyclopentane.
8. 1,1,2 - trichloro - 2 - monochloromethoxyhexafluorocyclopentane.
9. 1,1,2 - trichloro - 2 - dichloromethoxyhexafluorocyclopentane.
10. A process for the preparation of halogenated cycloalkylethers selected from the group consisting of halogenated cyclopentylethers and halogenated cyclohexylethers, which comprises chlorinating a corresponding chloromethoxyhalogenated cyclopentene or cyclohexene, the chloro and methoxy groups being vicinally attached to the unsaturated carbon atoms of the double bond, in the presence of actinic radiation, while maintaining reaction temperatures below about 25° C.
11. The process of claim 10 in which reaction temperatures are maintained below about 10° C.
12. A process for preparing the compounds of claim 1 which comprises chlorinating the corresponding halogenated ether of the formula:

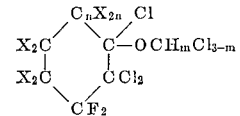

wherein X is F or Cl and $n$ is 0–1, in the presence of actinic radiation, while maintaining reaction temperatures below about 25° C.

13. The process of claim 12 in which $n=1$ and reaction temperatures are maintained substantially in the range of about 0–10° C.

14. The process of claim 12 in which $n=0$ and reaction temperatures are maintained substantially in the range of 0–10° C.

15. The process for the preparation of 1,1,2-trichloro-2-methoxyoctafluorocyclohexane which comprises chlorinating 1-chloro-2-methoxyoctafluorocyclohexene-1, in the presence of actinic radiation, until the ratio of the moles of evolved HCl to the moles of 1-chloro-2-methoxyoctafluorocyclohexene-1 starting material charged is about 0.3:1, while maintaining reaction temperatures below about 10° C.

16. The process for the preparation of 1,1,2-trichloro-2-monochloromethoxyoctafluorocyclohexane which comprises chlorinating 1-chloro-2-methoxyoctafluorocyclohexene-1, in the presence of actinic radiation, until the ratio of evolved moles of HCl to the moles of 1-chloro-2-methoxyoctafluorocyclohexene-1 starting material charged is about 0.8:1, while maintaining reaction temperatures below about 10° C.

17. The process for the preparation of 1,1,2-trichloro-2-dichloromethoxyoctafluorocyclohexane which comprises chlorinating 1-chloro-2-methoxyoctafluorocyclohexene-1, in the presence of actinic radiation, until the ratio of evolved moles of HCl to the moles of 1-chloro-2-methoxyoctafluorocyclohexene-1 starting material charged is about 1.3:1, while maintaining reaction temperatures below about 10° C.

18. The process for the preparation of 1,1,2-trichloro-2-methoxyhexafluorocyclopentane which comprises chlorinating 1-chloro-2-methoxyhexafluorocyclopentene-1, in the presence of actinic radiation, until the ratio of moles of evolved HCl to the moles of 1-chloro-2-methoxy-hexafluorocyclopentene-1 starting material charged is about 0.2:1, while maintaining reaction temperatures below about 10° C.

19. The process for the preparation of 1,1,2-trichloro-2-monochloromethoxyhexafluorocyclopentane which comprises chlorinating 1-chloro-2-methoxyhexafluorocyclopentene-1, in the presence of actinic radiation, until the ratio of moles of evolved HCl to the moles of 1-chloro-2-methoxyhexafluorocyclopentene-1 starting material charged is about 0.7:1, while maintaining reaction temperatures below about 10° C.

20. The process for the preparation of 1,1,2-trichloro-2-dichloromethoxyhexafluorocyclopentane which comprisen chlorinating 1-chloro-2-methoxyhexafluorocyclopentene-1, in the presence of actinic radiation for a period of time such that the ratio of moles of evolved HCl to the moles of 1-chloro-2-methoxyhexafluorocyclopentene-1 starting material charged is about 2.1:1, while maintaining reaction temperatures below about 10° C.

References Cited

UNITED STATES PATENTS 2,824,141   2/1958   Zisman et al. \_\_\_\_ 260—611 XR

OTHER REFERENCES

Cady, Proceedings of the Chemical Society (London) (1960) pp. 133, 138.

BERNARD HELFIN, *Primary Examiner.*

U.S. Cl. X.R.

161—189; 204—158; 252—364; 260—33.2